April 5, 1949.  H. E. CARNAGUA  2,466,206
TRANSMISSION
Filed March 8, 1943
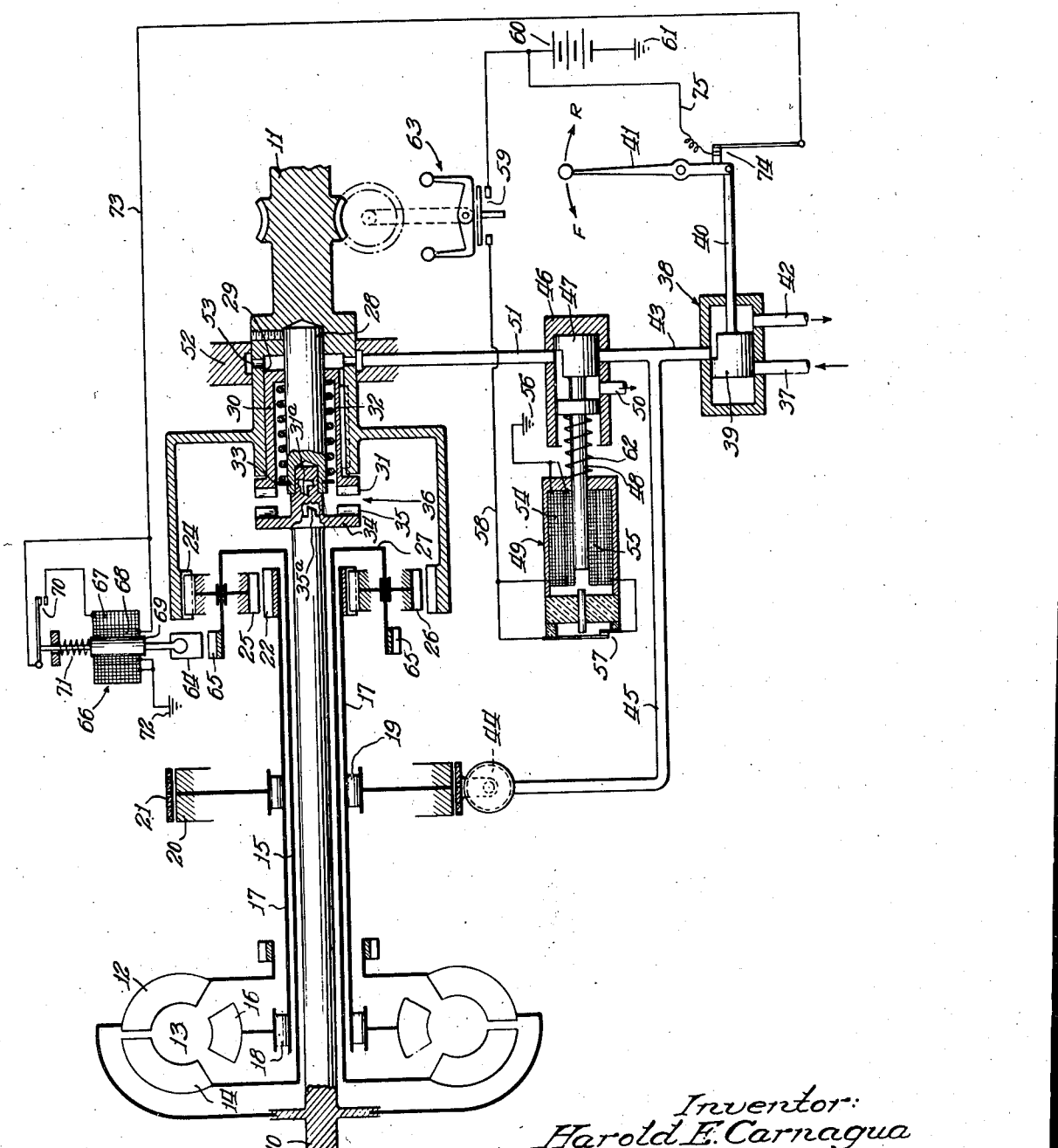
Inventor:
Harold E. Carnagua
By: Edward C. Fitzbaugh
Atty Patented Apr. 5, 1949

2,466,206

UNITED STATES PATENT OFFICE 2,466,206

TRANSMISSION

Harold E. Carnagua, Muncie, Ind., assignor to Borg-Warner Corporation, Chicago, Ill., a corporation of Illinois Application March 8, 1943, Serial No. 478,347

20 Claims. (Cl. 74—677)

My invention relates to transmissions and more particularly to transmissions for automotive vehicles.

Transmissions have been proposed which comprise a hydrodynamic coupling device adapted to drive an intermediate shaft, planetary gearing driven by the intermediate shaft and adapted to drive the output shaft of the transmission at a lower speed than that of the intermediate shaft, and friction clutch means for locking up the hydrodynamic device and friction clutch means for locking up the planetary gearing whereby the output shaft is driven in direct drive. Such a transmission is shown in the co-pending application of John M. Simpson and Harold E. Carnagua, Serial No. 426,122, filed January 9, 1942.

It is an object of my invention to provide for use in such a transmission, instead of the friction clutch means for locking up the hydrodynamic device and planetary gearing, positive clutch means for connecting directly the input and output shafts of the transmission. More particularly, it is an object of my invention to provide such positive clutch means which include means for maintaining the positive clutch means out of engagement except when the input and output shafts are substantially in synchronism.

It is another object of my invention to provide governor controlled means for conditioning the positive clutch means for engagement when one of the shafts of the transmission increases beyond a predetermined speed. It is contemplated that the governor shall preferably be responsive to the speed of the output shaft of the transmission and that the governor shall control a valve for admitting fluid pressure to the positive clutch means for so conditioning the clutch means for engagement.

The invention consists of the novel constructions, arrangements, and devices to be hereinafter described and claimed for carrying out the above stated objects and such other objects as will appear from the following description of a certain preferred embodiment of a transmission and control mechanism therefor embodying the principles of my invention which is schematically illustrated in the accompanying drawing.

Referring now to the drawing, the illustrated transmission comprises an input or driving shaft 10 and an output or driven shaft 11. The shaft 10 is connected to drive the impeller element 12 of a hydrodynamic coupling device 13, which in the illustrated embodiment of the invention is a torque converter. The torque converter comprises, in addition to the element 12, a driven element 14 supported by and adapted to drive a tubular shaft 15, which may be termed an intermediate shaft, and the torque converter comprises also a stator element 16 which is carried by a tubular shaft 17 rotatably disposed on the shaft 15. A one-way brake 18, preferably of the roller type, is disposed between the shaft 17 and the stator element 16 and another similar one-way brake 19 is disposed between the shaft 17 and a brake drum 20 which is adapted to be restrained from rotation by means of a brake band 21. The brakes 18 and 19 function when the brake 21 is operative to allow forward rotation of the element 16 but to prevent reverse rotation thereof. The torque converter 13 is of the well known type in which the driving element by rotation thereof functions to drive the driven element by means of fluid disposed in a housing for the elements and in which the stator element functions when the associated brake drum 20 is restrained from rotation to cause the driven element to be rotated at a higher torque than that which is applied to the driving element and in which the one-way brake 18 functions to allow the stator element to move in a forward direction along with the driving and driven elements when the speed of the driven element has increased above a predetermined value.

Planetary gearing is provided which is adapted to drive the output shaft 11 and is driven by the torque converter 13. The planetary gearing comprises a sun gear 22 carried by the shaft 17, a ring gear 24 connected with the output shaft 11, a plurality of planet gears 25 (one being shown in the drawing) in mesh with the ring gear 24, a plurality of planet gears 26 (one being shown in the drawing) in mesh with the sun gear 22 and each of which is in mesh with a planet gear 25, and a carrier 27 for the planet gears 25 and 26 which is fixed to the shaft 15. The planetary gearing functions, when the shaft 15 and thereby the planet gear carrier 27 are driven and with brake 21 engaged, to drive the ring gear 24 and thereby the output shaft 11 in a forward direction at a speed slower than that of the shaft 15. The sun gear 22 is held against backward rotation by the brakes 19 and 21, and the sun gear thus acts as the reaction means of the planetary gearing.

The output shaft 11 has fixed therein a stub shaft 28, and the driving shaft 10 is piloted in the shaft 28 as shown. The shaft 11 is formed with a cylindrical cavity 29 in which is slidably disposed a sleeve-like member 30 which is keyed to rotate with the shaft 11 and is provided with clutch teeth 31. A compression spring 32 is disposed on the shaft 28 inside the member 30 between an end of the member 30 and a collar 33 fixed on the shaft 28, and the spring functions to hold the member 30 yieldably at the limit of its movement in the cavity 29. The driving shaft 10 is provided adjacent the teeth 31 with a portion 34 having teeth 35 formed thereon. The teeth 31 and 35 are adapted to mesh and interlock when the member 30 is moved outwardly of the cavity 29, and the teeth thus form a positive type clutch which may be designated generally as 36. Each of the teeth 31 is formed with a slanted or cammed end 31a and each of the teeth 35 is formed with an end 35a which is slanted or cammed in the same direction as the tooth ends 31a. The cammed ends of the teeth 31 and 35 function, if the member 30 is moved in a direction to inter-engage the teeth 31 and 35, to prevent such engagement when the shaft 10 is rotating in a forward direction at a speed faster than that of the driven shaft 11, as would be the case when the driven shaft is being rotated by means of the planetary gearing. It will be apparent that the clutch 36 when engaged functions to directly couple driving shaft 10 and the driven shaft 11, and if the brake band 21 is engaged to hold the brake drum 20 against rotation, the one-way brake 19 will permit the sun gear 22 to rotate in a forward direction to break the power train through the planetary gearing.

The illustrated transmission provides two speed ratios in forward drive. When the brake 21 is engaged and with the clutch teeth 31 and 35 being out of engagement, the drive is then in low speed forward from the shaft 10 through the converter 13, shaft 15, carrier 27, planet gears 26 and 25 and ring gear 24 to shaft 11. The shaft 11 in this speed ratio is driven at a lower speed than that of both the shafts 10 and 15. The shaft 11 is driven in high speed forward drive or direct drive when the clutch teeth 31 and 35 are engaged. The drive is then from shaft 10 through clutch teeth 31 and 35 to shaft 11.

The brake band 21 and the positive clutch member 30 are preferably controlled by fluid pressure, such as oil under pressure. A conduit 37 is connected to any suitable source of fluid under pressure and is connected with a valve 38 which comprises a slidable piston 39. The piston 39 is connected by means of a link 40 with a lever 41 adapted to be manually operated. The valve 38 is provided with a bleed conduit 42 and is connected also with a conduit 43. The valve piston 39 and the lever 41 are shown in their neutral positions in the drawing, and in such positions the valve piston 39 acts to bleed or freely drain fluid from the conduit 43 through the bleed conduit 42, as is apparent. When the lever 41 is moved in a clockwise direction and the piston 39 is moved to the left as seen in the figure, the piston functions in the same manner as in neutral, and when the lever 41 is rotated counterclockwise from its neutral position to move the piston 39 to the right as seen in the figure, the valve 38 functions to connect the conduits 37 and 43, as is apparent.

The brake band 21 is adapted to be brought into engagement with the brake drum 20 by means of any suitable fluid pressure responsive device such as a piston 44 which is connected by means of a conduit 45 with the conduit 43. The arrangement is such that when the lever 41 is moved counterclockwise to connect the conduit 37 with the conduits 43 and 45, fluid under pressure is supplied to the brake operator 44 through the conduit 45 to engage the brake band 21 on the brake drum 20. The one-way clutch 19 is then operative to prevent rearward rotation of the shaft 17.

The conduit 43 is connected to a valve 46 having a valve piston 47 which is connected with an armature 48 of an electromagnet 49. The valve 46 is provided with a bleed conduit 50 and is also connected to a conduit 51. The conduit 51 passes through a portion 52 of the housing for the transmission, and openings 53 are provided in the shaft 11 to connect the conduit 51 with the cylindrical cavity 29 in the shaft 11 between the member 30 and the closed end of the cavity 29.

The electromagnet 49 comprises an energizing winding 54 and a holding winding 55 both of which are grounded at 56. The energizing winding 54 is connected by means of a switch 57, which is adapted to be opened by means of the armature 48 when the armature is moved to the left as seen in the drawing, and by means of a lead 58 and a switch 59 in the latter lead with the battery 60 of the vehicle which is grounded at 61. The holding coil 55 is connected directly to the lead 58 as shown. The armature 48 along with the piston 47 is moved to the left when the winding 54 is energized, as is apparent, and a spring 62 is provided for moving the armature 48 and the piston 47 back to their positions as shown in the figure. The switch 59 in the lead 58 is adapted to be actuated by a governor 63 which is connected with the output shaft 11 so as to be responsive to the speed thereof and also to the speed of the vehicle. The arrangement is such that when the speed of the output shaft is below a predetermined value, the switch 59 is open and when the speed of the output shaft is above this value, the switch 59 is closed.

When neither of the windings 54 and 55 is energized, the piston 47 is in its position as shown to connect the conduits 51 and 50 for draining fluid from the conduit 51. With the brake band 21 engaged on the drum 20, the driven shaft 11 is then driven in low speed drive through the torque converter 13 and planetary gearing. The windings 54 and 55 are energized upon the speed of the driven shaft 11 increasing above the critical speed of the governor 63, whereby the switch 59 is closed, and the armature 48 is thereby moved inwardly with respect to the windings 54 and 55 to move the piston 47 to block the conduit 50 and to connect the conduits 43 and 51. The armature on such movement opens the switch 57, and the coil 54 is thereby deenergized; however, the coil 55 remains energized and the armature and valve piston 47 are thereby held in their positions for connecting the conduits 43 and 51. Upon connection of the conduits 43 and 51, fluid under pressure is supplied to the cavity 29 to move the clutch member 30 to the left as seen in the figure to bring the clutch teeth 31 and 35 into contact. If the shaft 10 is rotating in a forward direction at a faster speed than the shaft 11, as would be the case when the drive is through the planetary gearing, the cammed ends 31a and 35a of the teeth will make contact and the clutch 36 will thereby be held out of engagement. If the vehicle is then allowed to coast with the brake 19 overrunning, to bring the shafts 10 and 11 into synchronism, the teeth 31 and 35 will engage, and the clutch 36 will directly connect the shafts 10 and 11. The transmission is then in high speed drive, and the brake 19 continues to overrun. If the speed of the driven shaft 11 decreases below the critical speed of the governor 63, the switch 59 will be opened thereby and the winding 66 will be deenergized. The spring 62 will then function to move the valve piston 47 to its position as shown in the figure, and fluid from the conduit 51 will drain through the conduit 50, and the spring 32 will then act to move the teeth 31 and 35 out of engagement. If the accelerator (not shown) of the vehicle is then released to relieve the torque on the teeth 31 and 35, the spring 32 will function to move the teeth 31 out of engagement with the teeth 35, and the drive will then be again through the planetary gearing and the output shaft will again be driven in low speed drive.

To provide reverse drive through the transmission, a pawl 64 is provided which is adapted to mesh with teeth 65 formed on the carrier 27. When the pawl 64 is in engagement with any of the teeth 65, the carrier 27, the shaft 15 and thereby the driven element 14 of the torque converter 13 are held from rotation. With the brake band 21 released and the clutch 36 disengaged, the stator element 16 will then be driven in a reverse direction with the element 14 acting as a stator, and the shaft 17, the sun gear 22, the ring gear 24 and the shaft 11 will be driven in a reverse direction through the one-way clutch device 18 and the planet gears 25 and 26. The pawl 64 is controlled by means of an electromagnet 66 comprising an energizing coil 67, a holding coil 68, an armature 69 connected with the pawl, a switch 70 adapted to be in open condition when the armature is at the upper limit of its movement due to energization of the windings 67 or 68, and a spring 71 for moving the armature and pawl downwardly. The coils 67 and 68 are grounded at 72, and the coil 68 is connected by a lead 73, a switch 74, and a lead 75 with the battery 60. The winding 67 is connected by means of the switch 70 with the lead 73. The switch 74 is actuated by the lever 41, and the arrangement is such that the switch 74 is closed when the lever 41 is in either its neutral position as shown in the drawing or in its forward drive position, being rotated counterclockwise as seen in the figure. With the switch 74 closed, the coil 68 is energized to hold the armature 69 and pawl 64 at the upper limits of their movement with the pawl 64 out of engagement with any of the teeth 65 and with switch 70 open. When the control lever 41 is rotated in a clockwise direction, to its reverse position as indicated in the drawing, the switch 74 is opened and the coil 68 is deenergized whereby the spring 71 functions to move the armature 69 and the pawl 64 downwardly to engage the pawl with any of the teeth 65 and thereby hold the carrier 26 stationary. The shaft 11 is then driven in a reverse direction as described above. When the lever 41 is moved back to its neutral position, the switch 74 is closed and the windings 67 and 68 are energized to move the armature and pawl upwardly for disengaging the pawl from the teeth 65. When the armature 69 is at the upper limit of its movement, the switch 70 is held open thereby, and the coil 68 continues to function to hold the armature in its uppermost position.

When the manually controlled lever 41 is in its neutral position as shown in the drawing, the brake band 21 is disengaged from the brake drum 20, the clutch 36 is disengaged and the pawl 64 is disengaged, and there is thus no drive through the transmission. When the lever 41 is moved in a counterclockwise direction to its forward drive position, fluid under pressure is supplied to both the valve 46 and the brake band engaging means 44, and, as long as the speed of the output shaft is below the critical value for the governor 63, the drive is through the torque converter 13 and the planetary gearing to rotate the driven shaft 11 at low speed ratio in a forward direction. When the speed of the shaft 11 has increased above the critical value for the governor 63, the governor causes fluid under pressure to be applied to the clutch member 30, and if the vehicle is thereafter allowed to coast, the clutch 36 will engage, and the output shaft 11 will then be driven in direct drive. When the speed of the driven shaft 11 thereafter decreases below the critical value for the governor, the clutch 36 may be disengaged by releasing the accelerator of the vehicle, and the shaft 11 will then again be driven at low speed ratio. When the control lever 41 is rotated to its reverse drive position, the pawl 64 is engaged with one of the teeth 65, and the shaft 11 will then be driven in a reverse direction through the torque converter 13 and the planetary gearing. When the lever 41 is in its reverse drive position, the valve piston 39 is moved to the left as seen in the figure to drain conduits 43 and 45 by means of conduit 42, and the brake 21 and clutch 36 thus cannot engage when the shaft 11 is driven in reverse drive.

My improved transmission and control mechanism therefor is quite simple in construction and arrangement. The transmission advantageously provides a yielding low speed drive through the torque converter and it provides also a direct positive type drive between the shafts of the transmission.

I do not intend to limit the invention to the details shown and described, except only insofar as certain of the appended claims are specifically so limited, as it will be obvious that modifications may be made without departing from the principles of the invention.

I claim:

1. In a transmission, the combination of a driving shaft, a driven shaft, a hydrodynamic coupling device driven by said driving shaft, planetary gearing driven by said hydrodynamic device and including a one-way brake, said gearing being adapted to drive said driven shaft at a lower speed than the driven element of said coupling device, and a positive type clutch for connecting directly said driving and driven shafts and providing a power train between the shafts independent of said coupling device whereby said one-way brake overruns, said clutch including means for maintaining the clutch disengaged when there is relative rotation between said shafts.

2. In a transmission, the combination of a driving shaft, a driven shaft, a hydrodynamic coupling device driven by said driving shaft, planetary gearing including a sun gear, a ring gear, planet gears in mesh with the sun and ring gears, and a carrier for said planet gears, said carrier being connected with said hydrodynamic device and said ring gear being connected with said driven shaft, a one-way brake for said sun gear, and a positive type clutch for connecting directly said driving and driven shafts and providing a power train between the shafts independent of said coupling device whereby said one-way brake overruns.

3. In a transmission, the combination of a driving shaft, a driven shaft, a hydrodynamic coupling device driven by said driving shaft, planetary gearing including a sun gear, a ring gear, a planet gear in mesh with said ring gear, a planet gear in mesh with said first named planet gear and said sun gear, and a carrier for said planet gears, said carrier being connected with said hydrodynamic device and said ring gear being connected with said driven shaft, a one-way brake for said sun gear, and a positive type clutch for connecting directly said driving and driven shafts and providing a power train between the shafts independent of said coupling device and including means for maintaining the positive clutch disengaged on relative rotation of said driving and driven shafts.

4. In a transmission, the combination of a driving shaft, a driven shaft, a hydrodynamic coupling device driven by said driving shaft, planetary gearing including a sun gear, a ring gear, a planet gear in mesh with said ring gear, a planet gear in mesh with said first named planet gear and said sun gear, and a carrier for said planet gears, said carrier being connected with the driven element of said hydrodynamic device and said ring gear being connected with said driven shaft, a one-way brake for said sun gear, and a positive type clutch for connecting directly said driving and driven shafts and providing a power train between the shafts independent of said coupling device, said clutch comprising two toothed interlocking members having the ends of their teeth cammed for maintaining the members out of interlocking engagement when there is relative rotation between said shafts.

5. In a transmission, the combination of a driving shaft, a driven shaft, planetary gearing connectible between said shafts for driving said driven shaft at a lower speed than said driving shaft, and a positive type clutch for connecting directly said driving and driven shafts, said clutch comprising two toothed interlocking members cammed on the ends of their teeth for maintaining the members out of interlocking engagement when there is relative rotation between said shafts, and means responsive to the speed of said driven shaft for urging said toothed members together on the speed of the driven shaft increasing beyond a predetermined value.

6. In a transmission, the combination of a driving shaft, a driven shaft, planetary gearing including a sun gear, a ring gear, planet gears in mesh with said sun and ring gears, and a carrier for said planet gears, said carrier being connected to be driven by said driving shaft and said ring gear being connected with said driven shaft, a one-way brake for said sun gear, a positive type clutch including two toothed interlocking members for connecting directly said driving and driven shafts, said clutch including means for maintaining the clutch out of engagement when there is relative rotation between said shafts, a governor responsive to the speed of said driven shaft, a source of fluid pressure, and a valve controlled by said governor for supplying fluid from said fluid source to one of said interlocking members to urge the member toward engaging position when the speed of the driven shaft has increased above a predetermined value.

7. In a transmission, the combination of a driving shaft, a driven shaft, planetry gearing including a sun gear, a ring gear, a planet gear in mesh with said ring gear, a planet gear in mesh with said first named planet gear and said sun gear, and a carrier for said planet gears, a hydrodynamic coupling device connected with said driving shaft and having a driven element, means for connecting said carrier with said driven element and means for connecting said ring gear with said driven shaft, a one-way brake for said sun gear, a manually controlled brake for rendering said one-way brake effective, a positive type clutch for connecting directly said driving and driven shafts, said clutch comprising two toothed interlocking members with the ends of their teeth being cammed for maintaining the members out of interlocking engagement when there is relative rotation between said shafts, a governor responsive to the speed of said driven shaft, a source of fluid pressure, and a valve controlled by said governor for suppling fluid from said fluid source to one of said members for urging the member toward engaging position when the speed of the driven shaft increases beyond a predetermined value.

8. In a transmission, the combination of a driving shaft, a driven shaft, planetary gearing including a one-way brake and connectible between said shafts for driving said driven shaft at a lower speed than said driving shaft, and a positive type clutch for connecting said driving and driven shafts whereby said one-way brake overruns, said positive type clutch comprising two toothed interlocking members cammed on the ends of their teeth for maintaining the members out of interlocking engagement when the driving shaft is rotating faster than the driven shaft.

9. In a transmission, the combination of a driving shaft, a driven shaft, planetary gearing including a sun gear, a ring gear, planet gears in mesh with the sun and ring gears, and a planet gear carrier, a one-way brake for said sun gear, means for connecting said ring gear and said driven shaft, means for connecting said carrier and said driving shaft to drive said driven shaft at a lower speed than said driving shaft, and a positive type clutch for connecting said driving and driven shafts whereby said one-way brake overruns, said clutch comprising two toothed interlocking members cammed on the ends of their teeth for maintaining the members out of interlocking engagement when said driving shaft is rotating faster than said driven shaft.

10. In a transmission, the combination of a driving shaft, a driven shaft, planetary gearing including a sun gear, a ring gear, a planet gear in mesh with said ring gear, a planet gear in mesh with said first named planet gear and said sun gear, and a carrier for said planet gears, a one-way brake for said sun gear, means for connecting said ring gear and said driven shaft, means for connecting said driving shaft and planet gear carrier for rotating the driven shaft at a speed lower than said driving shaft, and a positive type clutch for connecting directly said driving and driven shafts whereby said one-way brake overruns, said clutch comprising two toothed interlocking members cammed on the ends of their teeth for maintaining the members out of interlocking engagement when said driving shaft is rotating faster than said driven shaft.

11. In a transmission, the combination of a driving shaft, a driven shaft, planetary gearing connectible between said shafts for driving said driven shaft at a different speed than said driving shaft, a positive type clutch for connecting directly said driving and driven shafts, said clutch comprising two toothed interlocking members cammed on the ends of their teeth for maintaining the members out of interlocking engagement when there is relative rotation between said shafts, a governor responsive to the speed of said driven shaft, a source of fluid pressure, and a valve controlled by said governor for supplying fluid from said fluid source to one of said interlocking members to urge the member toward interlocking engagement with the other toothed member when the speed of the driven shaft has attained a predetermined value.

12. In a transmission, the combination of a driving shaft, a driven shaft, a hydrodynamic coupling device driven by said driving shaft, planetary gearing driven by said hydrodynamic device and including a sun gear, a ring gear, planet gears in mesh with said sun and ring gears, and a carrier for said planet gears, said carrier being connected to be driven by said hydrodynamic device and said ring gear being brake for said sun gear, a positive type clutch connected with said driven shaft, a one-way including two toothed interlocking members for connecting directly said driving and said driven shafts, said clutch including means for maintaining the clutch out of engagement when there is relative rotation between said shafts, a governor responsive to the speed of said driven shaft, a source of fluid pressure, and a valve controlled by said governor for supplying fluid from said fluid source to one of said interlocking members to urge the member toward interlocking engagement with the other toothed member when the speed of the driven shaft has increased above a predetermined value.

13. In a transmission, the combination of a driving shaft, a driven shaft, a hydrodynamic coupling device driven by said driving shaft, planetary gearing driven by said hydrodynamic device and including a one-way brake, said gearing being adapted to drive said driven shaft at a lower speed than the driven element of said coupling device, and a positive type clutch for connecting directly said driving and driven shafts and providing a power train between the shafts independent of said coupling device whereby said one-way brake overruns, said clutch comprising two toothed interlocking members having the ends of their teeth cammed for maintaining the members out of interlocking engagement when said driving shaft rotates faster than said driven shaft.

14. In a transmission, the combination of a driving shaft, a driven shaft, a hydrodynamic coupling device driven by said driving shaft, planetary gearing driven by said hydrodynamic device and adapted to drive said driven shaft at a lower speed than the driven element of said coupling device, said gearing including a sun gear, a ring gear, planet gears in mesh with the sun and ring gears and a carrier for said planet gears, said carrier being connected with said hydrodynamic device and said ring gear being connected with said driven shaft, a one-way brake for said sun gear, and a positive type clutch for connecting directly said driving and driven shafts and providing a power train between the shafts independent of said coupling device whereby said one-way brake overruns, said clutch comprising two toothed interlocking members having the ends of their teeth cammed for maintaining the members out of interlocking engagement when said driving shaft rotates faster than said driven shaft.

15. In a transmission, in combination, a driving shaft and a driven shaft, a hydrodynamic coupling device driven by said driving shaft, an intermediate tubular shaft driven by said hydrodynamic coupling device, planetary gearing driven in a forward direction solely by said tubular shaft and including a one-way brake, said gearing being adapted to drive said driven shaft at a different speed than said driving shaft, an extension on said driving shaft, said extension being encircled by said tubular shaft, and a positive type clutch for connecting directly the extension on said driving shaft with said driven shaft, whereupon said one-way brake overruns.

16. In a transmission, in combination, a driving shaft and a driven shaft, a hydrodynamic coupling device driven by said driving shaft, an intermediate tubular shaft driven by said hydrodynamic coupling device, planetary gearing driven in a forward direction solely by said tubular shaft and including a one-way brake, said gearing being adapted to drive said driven shaft at a different speed than said driving shaft, an extension on said driving shaft, said extension being encircled by said tubular shaft, and a positive type clutch for connecting directly the extension on said driving shaft with said driven shaft, whereupon said one-way brake overruns, said positive type clutch including two toothed interlocking members cammed on the ends of their teeth for maintaining the members out of interlocking engagement when there is relative rotation between the shafts.

17. In a transmission, in combination, a driving shaft and a driven shaft, a hydrodynamic coupling device including impeller, stator and driven elements, said impeller element being driven by said driving shaft, a first tubular shaft driven by the driven element, an extension on said driving shaft, said extension being encircled by said first tubular shaft, a second tubular shaft, said latter shaft being rotatably supported on said first tubular shaft and being connected with the stator element of said hydrodynamic coupling device, planetary gearing including a sun gear, a ring gear, planet gears in mesh with the sun and ring gears and a carrier for said planet gears, said carrier being connected with said first tubular shaft and said ring gear being connected with said driven shaft and said sun gear being connected with said second tubular shaft, a one-way brake for said second tubular shaft, a one-way brake for said second tubular shaft permitting the shaft to rotate freely in a forward direction, said planetary gearing permitting said driven shaft to be driven at a different speed than said driving shaft, and a positive type clutch for connecting directly the extension on said driving shaft with said driven shaft, whereupon said one-way brake overruns.

18. In a transmission, in combination, a driving shaft and a driven shaft, a hydrodynamic coupling device including impeller, stator, and driven elements, said impeller element being driven by said driving shaft, a first tubular shaft driven by said driven element, an extension on said driving shaft, said extension being encircled by said first tubular shaft, a second tubular shaft, said latter shaft being rotatably supported on said first tubular shaft and being connected with the stator element of said hydrodynamic coupling device, planetary gearing including a sun gear, a ring gear, planet gears in mesh with the sun and ring gears and a carrier for said planet gears, said carrier being connected with said first tubular shaft and said ring gear being connected with said driven shaft and said sun gear being connected with said second tubular shaft, a one-way brake for said second tubular shaft permitting the shaft to rotate freely in a forward direction, said planetary gearing permitting said driven shaft to be driven at a different speed than said driving shaft, and a positive type clutch for connecting directly the extension on said driving shaft with said driven shaft whereupon said one-way brake overruns, said positive type clutch including two toothed interlocking members cammed on the ends of their teeth for maintaining the members out of interlocking engagement when there is relative rotation between the shafts.

19. In a transmission, in combination, a driving shaft and a driven shaft, a hydrodynamic coupling device including impeller, stator and driven elements, said impeller element being a first tubular shaft driven by the impeller, an extension on said driving shaft, said extension being encircled by said first tubular shaft, a second tubular shaft, said latter shaft being rotatably supported on said first tubular shaft, a one-way clutch between the stator element and said second tubular shaft permitting said shaft to rotate freely in a forward direction, planetary gearing including a sun gear, a ring gear, a planet gear in mesh with said ring gear, a planet gear in mesh with said first named planet gear and said sun gear, and a carrier for said planet gears, said carrier being connected with said first tubular shaft and said ring gear being connected with said driven shaft and said sun gear being connected with said second tubular shaft, a one-way brake for said second tubular shaft permitting the shaft to rotate freely in a forward direction, a positive brake for said planet gear carrier, means for rendering said one-way brake and said positive brake alternately effective, said planetary gearing permitting said driven shaft to be driven in a forward direction by said first tubular shaft at a different speed than said driving shaft when said one-way brake is rendered effective and permitting said driven shaft to be driven in a reverse direction by said second tubular shaft when said positive brake is rendered effective, and a positive type clutch for connecting directly the extension on said driving shaft with said driven shaft, whereupon said one-way brake overruns.

20. In a transmission in combination, a driving shaft and a driven shaft, a hydrodynamic coupling device including impeller, stator and driven elements, said impeller element being driven by said driving shaft, a first tubular shaft driven by the driven element, an extension on said driving shaft, said extension being encircled by said first tubular shaft, a second tubular shaft, said latter shaft being rotatably supported on said first tubular shaft, a one-way clutch between the stator element and said second tubular shaft permitting said shaft to rotate freely in a forward direction, planetary gearing including a sun gear, a ring gear, a planet gear in mesh with said ring gear, a planet gear in mesh with said first named planet gear and said sun gear, and a carrier for said planet gears, said carrier being connected with said first tubular shaft and said ring gear being connected with said driven shaft and said sun gear being connected with said second tubular shaft, a one-way brake for said second tubular shaft permitting the shaft to rotate freely in a forward direction, a positive brake for said planet gear carrier, means for rendering said one-way brake and said positive brake alternately effective, said planetary gearing permitting said driven shaft to be driven in a forward direction by said first tubular shaft at a different speed than said driving shaft when said one-way brake is rendered effective and said planetary gearing is permitting said driven shaft to be driven in a reverse direction by said second tubular shaft when said positive brake is rendered effective, and a positive type clutch for connecting directly the extension on said driving shaft with said driven shaft whereupon said one-way brake overruns, said positive type clutch including two toothed interlocking members cammed on the ends of their teeth for maintaining the members out of interlocking engagement when there is relative rotation between the shafts.

HAROLD E. CARNAGUA.

REFERENCES CITED

The following references are of record in the file of this patent:

UNITED STATES PATENTS

| Number | Name | Date |
| --- | --- | --- |
| 1,755,804 | Barbarou | Apr. 22, 1930 |
| 1,839,145 | Forichon | Dec. 29, 1931 |
| 2,106,423 | DeLavaud | Jan. 25, 1938 |
| 2,146,369 | Dodge | Feb. 7, 1939 |
| 2,205,794 | Jandasek | June 25, 1940 |
| 2,223,614 | Hopkins | Dec. 3, 1940 |
| 2,250,316 | Vincent | July 22, 1941 |
| 2,254,334 | Vincent | Sept. 2, 1941 |
| 2,272,434 | Schjolin | Feb. 10, 1942 |
| 2,308,113 | Schjolin | Jan. 12, 1943 |
| 2,308,547 | Schneider | Jan. 19, 1943 |

FOREIGN PATENTS

| Number | Country | Date |
| --- | --- | --- |
| 443,283 | Great Britain | Feb. 25, 1936 |
| 510,354 | Great Britain | July 24, 1939 |

Certificate of Correction

Patent No. 2,466,206.

April 5, 1949.

HAROLD E. CARNAGUA

It is hereby certified that error appears in the printed specification of the above numbered patent requiring correction as follows:

Column 12, line 20, claim 20, after the word "gearing" strike out *is*;

and that the said Letters Patent should be read with this correction therein that the same may conform to the record of the case in the Patent Office.

Signed and sealed this 20th day of September, A. D. 1949.

[SEAL]

JOE E. DANIELS,
*Assistant Commissioner of Patents.*